Jan. 18, 1966 W. F. MATHEWSON 3,229,815
PULP SCREEN OR FILTER
Filed Dec. 5, 1961 7 Sheets-Sheet 1

FIG.1

INVENTOR.
Wilfred F. Mathewson
BY Robert C. Churchill
ATTORNEY

INVENTOR
Wilfred F. Mathewson
BY Robert P. Churchill
ATTORNEY

Jan. 18, 1966  W. F. MATHEWSON  3,229,815
PULP SCREEN OR FILTER
Filed Dec. 5, 1961  7 Sheets-Sheet 7

INVENTOR.
Wilfred F. Mathewson
BY Robert C. Churchill
ATTORNEY

United States Patent Office 3,229,815
Patented Jan. 18, 1966

3,229,815
PULP SCREEN OR FILTER
Wilfred F. Mathewson, 21 Morrell St.,
North Weymouth 91, Mass.
Filed Dec. 5, 1961, Ser. No. 157,155
10 Claims. (Cl. 209—250)

This invention relates to a machine for screening fluid and is of the type in which the unscreened stock is delivered onto the interior face of an operationally rotatable screening wall and is of the type which can be used either as a screen for screening raw stock to separate therefrom a screen-passed fraction of superior quality or can be used as a filter for pulp stock to strain or filter out from the stock a portion of the fluid content thereof in order to thicken said stock, and/or salvage some of the fluid content in which respects the present invention comprises an improviment over my United States Patent No. 3,002,621, issued October 3, 1961.

One object of this invention is to provide a screen wherein the screening capacity is augmented by means of a pressure differential between the interior and the exterior of a cylindrical wall, a novel wall assisting in the maintenance of said pressure differential by pneumatic means.

Another object of this invention is to provide a novel cylindrical screen washing system wherein an internal shower cooperates with a backwashing flow emitting from the screening slots to strip the screening wall of retained material and flush it away, said backwashing flow being one part of the flow delivered from a slot in an external flushing fluid tube, the balance of this flow serving to wash the exterior face and structural portions within the screening wall itself and said external flushing water tube is located in a substantially stationary position between the screening wall and a support grid for the screening wall which is rotatable therewith.

Yet another object of this invention is to provide a pulp screen for fibrous pulp suspensions such as used in making paper which is constructed to facilitate the removal as a unit of the rotatable screen structure other than the driving means together with such enclosures within the rotatable unit as may operationally be held in a stationary position.

In the drawings illustrating the preferred embodiment of the invention:

FIG. 3 is a view in cross section taken on the line 3—3 of FIG. 4, with portions broken out and shown in cross section of details to be referred to;

In general, the present drawings illustrate a machine for treating pulp stock having pulp screens or filters of a type utilizing the tendency of the fibers in fluid suspension to become aligned with the flow by virtue of a contracting flow in a nozzle and in a free-falling sheet of the pulp suspension after issuance from said nozzle, said free-falling sheet flow contacting with the smallest possible obliquity the interior of a cylindrical screening wall rotating at a speed substantially the same as that of the linear flow of the contacting pulp sheet to form a layer on the interior of said cylindrical screening wall with the smallest posible disturbance of such fiber alignment as may have been obtained in the free-falling sheet. Examples of such arrangements are shown in my United States Patents Nos. 3,002,621 and 3,002,622.

The present invention combines the advantages of the structure shown in my United States Patent No. 3,002,622 with an internal screen washing facility and a novel pneumatic screen pressurizing facility not described in either of my prior patents above referred to. While modification of the design shown in my United States Patent No. 3,002,622 might seem the simpler method of securing such advantages, I find that better results are assured with a modification of the design of my United States Patent No. 3,002,621, as this offers less possibility of contamination of the pulp with lubricant from bearings and gears, better windowing of the screening chamber for visual observation, simpler confinement of the various entering and issuing flows and safer facilities for insertion and removal of the screen element proper. The alterations are manifold, as will appear in the following description.

While reference is thus made to my prior designs, it is to be understood that it is intended that the following description shall be complete in itself without further reference to my prior designs.

Figure 1:
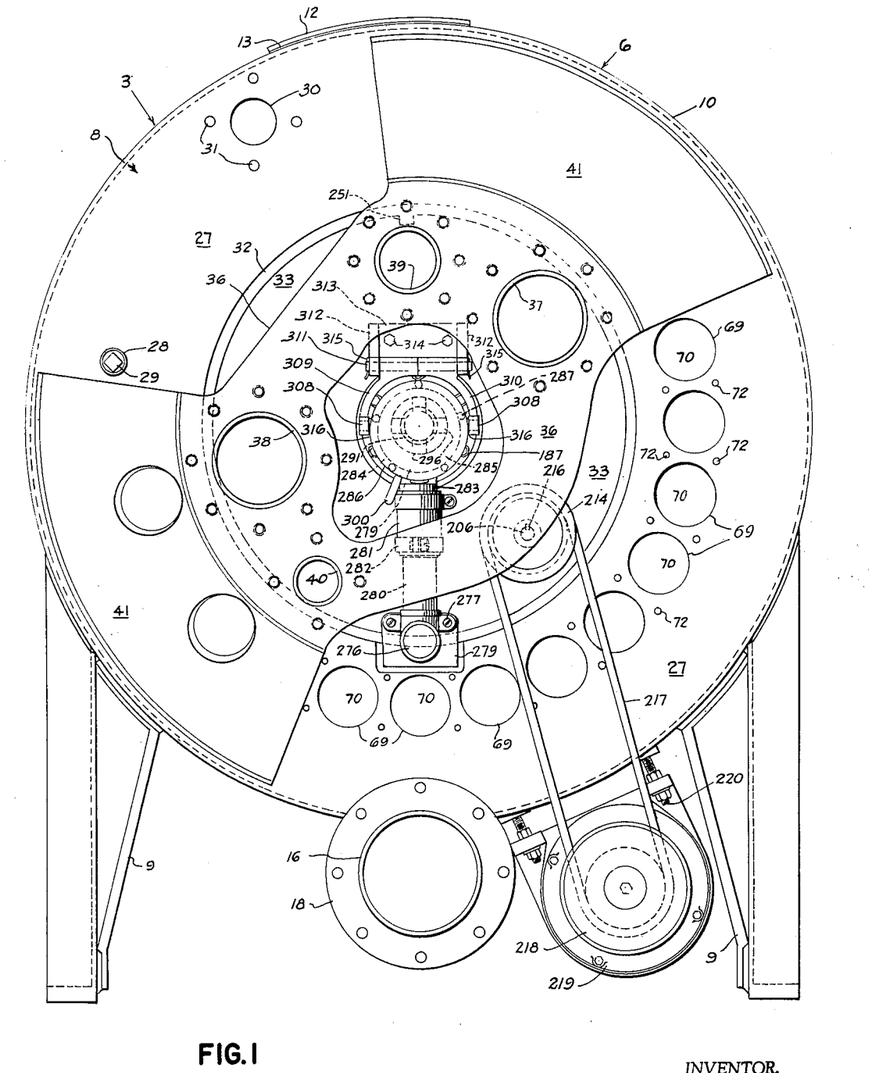
FIG. 1 is a view in front elevation of the present machine showing the end of the pulp screen through which the unscreened pulp stock is delivered and through which the screen-passed fluid and the flushed screen-retained fraction are discharged.

Referring now to the drawings, and particularly to FIG. 1, the apparatus embodying this invention includes a casing, indicated generally at 3, with appropriate apertures for: the admission of raw stock; the admission separately of washing or flushing water for external and internal application to the screening wall; the removal of the screen-passed fraction with incidental wash water; the removal of the flushed screen-retained fraction; the admission of air or other gas to a chamber confining the interior of the screening wall; the removal of air or other gas from a chamber confining the exterior of the screen wall; and other apertures with appropriate closures therefor, all of which will be described in their proper connections.

The apparatus also includes a screen structure unit indicated generally at 4 which is located within the casing and is mounted for rotation about a horizontal axis, said rotatable screen structure including a cylindrical screening wall indicated at 5.

Figure 3:
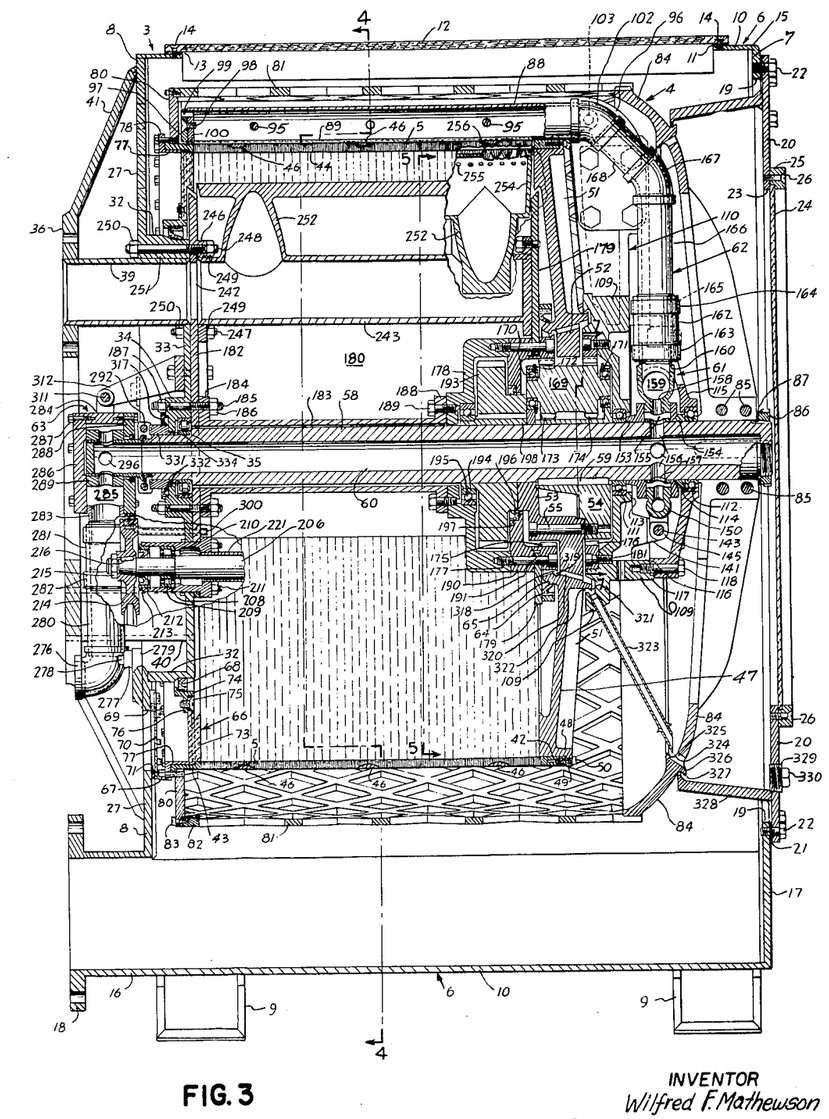

The casing 3 comprises a composite structure including a body portion indicated at 6 and permanently attached thereto, as by welding, a rear end portion 7 as indicated at the right hand side of FIG. 3, a front end portion 8 as indicated at the left hand side of FIG. 3, and external feet indicated at 9. The body portion 6 consists principally of a shell 10 extending with uniform cross section, except for the aperture 11 provided at its top, from the rear end portion 7 to the front end portion 8. A closure 12 is provided for the aperture 11 which is seated on the shell 10 with a gasket 13 interposed and which is attached to the shell 10 with screws indicated typically at 14. The shell 10 consists of a cylindrical portion indicated at 15 generally surrounding the rotatable screen structure unit 4 except for the aforementioned aperture 11 and a discontinuity at its bottom where it abuts a portion of a pipe indicated at 16 in FIG. 4 to which it is attached by welding. The portion of pipe 16 is also discontinuous between the positions where it abuts the cylindrical portion 15 so that a free passage is provided between the interior of cylindrical portion 15 and the interior of the pipe 16, and the screen-passed material deliverable within the cylindrical portion 15 is thus collectable in the pipe portion 16. At its rear end the pipe 16 is closed by and permanently attached to an extension 17 of the rear end portion 7 permanently attached thereto. At its front end the pipe portion 16 continues with a full circumference beyond the end portion 8 to which it is also permanently attached to a conventional type of pipe flange 18 for final delivery of the screen-passed fraction to external piping.

The rear end portion 7 of the casing 3 has an aperture 19 to admit the screen structure unit 4 into the casing. A closure 20 for the aperture 19 is mounted, with a gasket 21 interposed, to the end portion 7 of the casing 3 with screws indicated typically at 22. The closure 20 is here shown provided with a window opening 23 and a window 24 therefor retained in a ring frame 25 attached to the closure 20 with screws indicated typically at 26.

The front end portion 8 is in itself a composite structure. The annular ring portion indicated at 27 is the portion permanently attached to the casing body portion 6. Holes are provided in this zone of the front end portion 8 for several specific purposes. A hole indicated at 28 provides access to the interior of the casing 3 for purposes that will be described at an appropriate point. Closure of this hole 28 is effected with a threaded plug 29. A hole is also provided at 30, as also shown in FIG. 1, which serves to gain access to that portion of the interior of the casing 3 that constitutes a chamber external to the screening wall 5 for purposes in connection with the pneumatic pressurizing of the screening operation. If pressurizing is effected by pneumatic pressure applied internally to the screening wall, the hole 30 may be merely a vent. If, alternatively, a vacuum is applied to the exterior of the screening wall the hole 30 would be connected to a suction line. Holes indicated typically at 31 are provided for mounting a pipe flange for this eventuality. The screen may also be operated at other pressures when convenient. The annular ring portion 27 is cut at the bottom to admit the pipe 16. A number of window holes are also cut in the annular ring portion 27 and windows are provided, as will be fully described in another connection.

A cylindrical portion 32 of the end portion 8 is permanently attached at one end to the interior of the annular ring portion 27 and at the other end to an inner face plate portion indicated at 33 of the end portion 8. At a central hole of the inner face plate portion 33 a cylindrical hub portion indicated at 34 is permanently attached providing a mounting for an anti-friction bearing 35 that supports one end of the shaft of the rotatable screen structure 4. Outwardly extending adapter pipe lines are permanently attached at other holes in the inner face plate portion 33. These adapter pipes outwardly terminate in a thick pipe mounting plate indicated at 36 to which they are also permanently attached. The thick pipe mounting plate 36 accommodates many of the external pipe connections that must be made in order to operate the pulp screen. The short adapter pipes are individually identified as to their usage as follows: the raw stock inlet adapter pipe is 37; the screen-retained flushed stock adapter pipe 38; the internal shower supply adapter pipe is 39; and the pneumatic screen interior pressurizing adapter pipe is 40, available for external connection when needed.

In addition to the support of the pipe mounting plate 36 offered by the rigid attachment of the pipes 37, 38, 39 and 40, further support is offered by means of the conically dished support element indicated at 41 which is permanently attached to 36 and also to the end portion 8 of the casing 3 at its annular ring portion 27.

Figure 14:
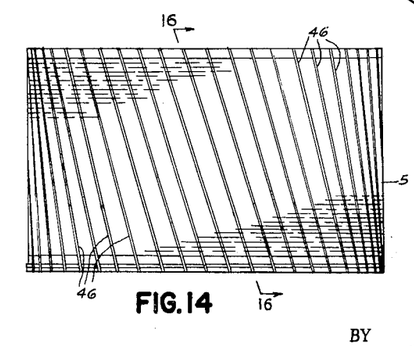
FIG. 14 is a view in side elevation of the cylindrical screening wall at a reduced scale.
Figure 15:
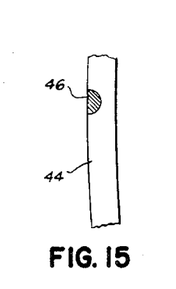
FIG. 15 is a view in front elevation at a relatively larger scale of a portion of a screening element, with a support bar in section.

The cylindrical screen wall 5 is provided with an annular rear extension indicated at 42 at the right hand end of 5 as seen in FIG. 3, and with a front annular extension indicated at 43 at the left hand end of 5 in corresponding fashion but with variations in the rim cross sections to meet the varying mounting requirements. The cylindrical screen wall 5 consists primarily of screening elements indicated typically at 44 (see FIGS. 14–16), which may be either annular rings or consecutive turns of a helical winding. These are spaced apart to form the screening slots indicated typically at 45. Support of these screening elements is provided by attached support bars indicated typically at 46 which are spirally located in the periphery of the screening wall at generally uniform intervals and also extend onto the annular reinforcing screen wall extensions 42 and 43 to which they are also attached.

Figure 9:
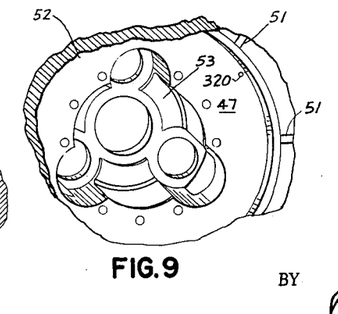
FIG. 9 is a perspective view of the rear side of the hub, broken out, of the direct screen drive flange showing part of the planet gear chassis.
Figure 10:
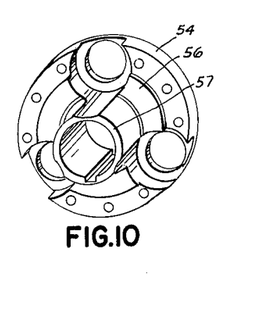
FIG. 10 is a perspective view of the closure for the planet gear chassis shown in FIG. 9.

A direct screen drive flange indicated at 47 supports the rear or right hand end of the screening wall 5, as seen in FIG. 3, at the annular extension 42 of the screening wall 5. The periphery of the direct screen drive flange 47 has a cylindrical portion 48 providing radial support for the screen wall 5 and a shoulder 49 providing a seat for this end of the screen wall 5. The screen wall 5 is retained on the shoulder 49 with screws shown typically at 50. From the cylindrical portion 48 the direct screen drive flange 47 extends inwardly as a slightly dished wall supported by integral ribs shown typically at 51 to a hub portion indicated at 52 which is hollowed out leaving only an inwardly extending flange indicated at 53 at the front end of the hub. A closure indicated at 54 (see also FIGS. 9 and 10), at the rear end of the hub portion 52 of the direct screen drive flange 47, is provided for the hollow hub. The hub portion 52 is attached with screws shown typically at 55 to said closure 54 which consists of a flange portion 56, shouldered for a small piloting entry into the hub portion 52 of the direct screen drive flange 47, and a cylindrical portion 57 which is rigidly and permanently attached, as by shrinking in place after heating, to the screen structure shaft indicated at 58, a portion of the rotatable screen structure unit 4. The screen structure shaft 58 may hereafter be referred to as the main shaft 58. The cylindrical portion 57 may also be keyed to the main shaft 58 with a key such as is indicated at 59.

The main shaft 58 is hollow, being provided with a central passage indicated at 60, for the flow of the external screen wash water through the shaft to a position where it may be removed from the shaft by means of a wash water collector device, indicated generally at 61, to stationary piping, indicated at 62, located within the generally rotatable screen structure unit 4 by means that will be further described. Another device comprising a wash water transfer device indicated at 63 provides for the admission of the wash water into the hollow main shaft 58, as will also be further described.

When it is desired to pressurize the screening operation by applying a pneumatic pressure differential between the interior and exterior of the screening wall 5, with the objective of increasing the screening capacity, it is essential that the interior of the screening wall be substantially chambered off in order to retain this pressure differential. At the rear or right hand end of the screening wall, as seen in FIG. 3, this is easily accomplished by making the screen drive flange 47 a substantially continuous wall inwardly as far as the seal indicated at 64 that rides on a forwardly projecting lip or shoulder 65 projected forwardly from the hub portion 52 of the direct screen drive flange 47. The seal 64 is of conventional type, made of rubber or other elastomer. At the left hand end, however, it will be observed that because of the stationary core structure internal to the screening wall 5, which it will be seen is one of the fundamental requirements of this invention, any end closure attached to the left hand end, as shown in FIG. 3, which comprises the front end of the screening wall 5 will have to be removed before the screen structure unit 4, otherwise complete, can be removed from the casing 3 through the aperture 19 in the rear end portion 7 of the casing 3.

For this reason the closure element indicated at 66, presently to be described, is removably attached to the screen structure unit 4 with screws shown typically at 67. Access to these screws for the purpose of removal is provided by the hole 28, see FIG. 1, in the annular ring portion 27 of the front end portion 8 of the casing 3. Closure of the hole 28 is effected with a threaded plug 29, as previously stated, during screen operation. At the inner boundary of the closure element 66 is a conventional type of seal ring, shown at 68, which rides on the cylindrical portion 32 of the front end portion 8 of the casing 3. This cylindrical portion 32 of the front end surrounds the various pipes that carry fluid to or from the interior of the cylindrical screen wall 5.

It is desirable that a windowed area be provided so that the bulk flow of the unscreened pulp stock to and along the cylindrical screening wall may be observed. I prefer that the windowed area be at the left hand end of the screening wall as viewed in FIG. 3, because of the lesser number of obstructions at this end. Thus, in the casing 3 window holes are provided at 69 in the annular portion 27 of the front end, and windows therefor are provided typically as at 70, the windows being mounted with gaskets such as at 71 interposed between the windows and the casing, and the windows are retained with screws such as are indicated at 72 in FIG. 1. For the rotatable screen structure unit 4 a window is best incorporated in the closure element 66. For reasons of better mechanical adaptation such a window, annular shaped, indicated at 73, is shown mounted in two ring elements, the inner one of which as indicated at 74 is fitted to the inside edge of the annular shaped window 73 and is retained thereon with screws shown typically at 75 entering the window through a radial flange portion indicated at 76 of the ring element 74. The seal 68, previously described as terminating the closure element 66, is also mounted in the ring 74.

Figure 16:
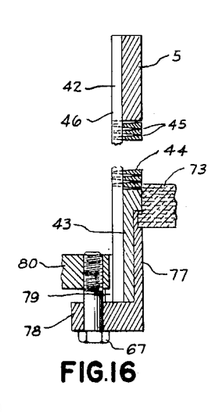
FIG. 16 is a view in cross section at a relatively larger scale of one side of the screening wall as taken on the line 16—16 of FIG. 14.

Another ring, comprising the outer ring indicated at 77, is retained on the outer periphery of the window 73 by means of shoulders in the ring 77, see also FIG. 16, one of the shoulders being formed by "spinning" or otherwise deforming a lip over the edge of the window after the window is positioned in the ring and seated against the other opposed shoulder. Externally, the ring 77 is positioned operationally on the interior of the extension 43 of the screening wall 5 except for a radial flange indicated at 78 extending outwardly through which the screws 67 pass retaining the flange 78 against an external shoulder portion shown at 79 of the screen wall extension 43 and also retaining this shoulder portion 79 to a support ring indicated at 80 that is a part of the rotatable screen structure unit 4 as the shoulder portion 79 of the screen wall extension 43 is interposed between the closure flange 78 and the support ring 80.

The support ring 80 supports the screening wall 5 by a neat fit between the inside diameter of the support ring 80 and the adjacent portion of the screening wall extension 43 as well as by the retention of the shoulder portion 79 to the support ring 80 as described. The support ring 80 is supported in turn by an open mesh support grid indicated at 81 at a continuous ring extension thereof permanently attached thereto, said ring extension being indicated at 82. The support of the ring 80 in the ring 82 is effected at the outer periphery of the support ring 80, one portion of this periphery being neatly fitted into the inside diameter of the grid extension ring 82 and another shoulder portion of the periphery being mounted to the outer end face of the grid extension ring 82 by means of screws indicated typically at 83.

The support of the front end of the screening wall 5 thus offered by the open mesh support grid 81 is in turn received at the rear end of the grid from an indirect screen support flange indicated at 84 to which the grid is permanently attached as by welding or brazing it thereto. The open mesh support grid 81 is, therefore, a primary structural element in the rotatable screen structure unit 4. As commercially available, the material known as flattened expanded metal is deemed the equivalent of of the generalized mesh material indicated in the drawings.

Figure 2:
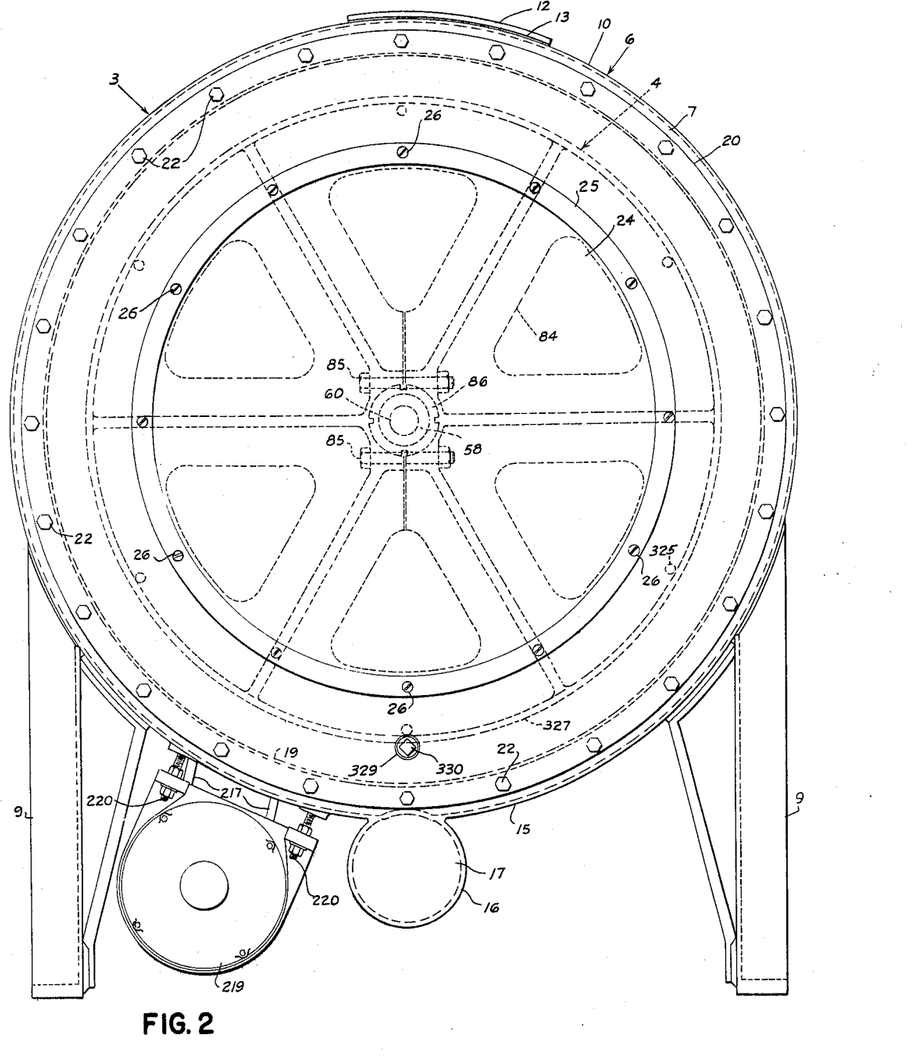
FIG. 2 is a view in rear elevation of the pulp screen.

The indirect screen support flange 84 extends in one piece from its periphery where it is attached to the grid 81 to the screen structure or main shaft 58. In the interest of rigidity the web of this support flange is dished, and six integral ribs are provided. In the interest of weight economy six large lightening holes spaced between the ribs are provided, see FIG. 2. The hub is split with one diametral cut extending into opposed lightening holes to permit the compression of the hub onto the main shaft 58 with four bolts indicated typically at 85, yet also permitting easy removal from the shaft when the bolts 85 are loosened. A retaining nut indicated at 86 and a lock washer therefor indicated at 87 at the end of the main shaft 58 provides for controlled clamping of the various parts mounted on this end of the main shaft 58.

Between the screening wall 5 and the support grid 81 of the rotatable assembly is interposed a stationarily held wash water emitting tube indicated at 88. Reference is made to FIGS. 18 to 21 showing details of this tube and its supporting means. This tube 88 is provided with an elongated slot indicated at 89 extending fully across the functional width of the screening cylinder 5 so that as the screen rotates the whole functional screening wall is serviced with external wash water. The emitting flow indicated at 90 in FIG. 4A from the wash water tube 88 serves primarily, with that portion of the flow indicated at 91, to backwash the screening slots 45. Another portion indicated at 92 of the emitting flow 90 serves to flush the exterior face of the screening wall 5 and as it penetrates underneath, as they operationally pass, the support bars 46 that are a structural component of the screening wall 5, it flushes the internally disposed faces of said support bars 46. It is in the furtherance of these objectives that the wash water emitting tube is closely spaced to the screen wall 5 by interposition between the support grid 81 and the screening wall 5 so that the flow 90 emitting from the wash water tube 88 need not fully be of a jet type but somewhat of a pressure type that encourages the emitting flow 90 to disperse in all directions. In the further assistance of this particular type of emitting flow the lips indicated at 93 and 94 are provided on either side of the wash water emitting slot 89. Stay rivets indicated typically at 95 are provided to reinforce the wash water tube 88 as weakened by the slot 89 in its general extension.

In addition to the wash water tube 88, a support bar indicated at 96 is interposed between the screening wall 5 and the support grid 81. The support of the tube 88 is effected at the front end thereof by an ear indicated at 97 extending from the support bar 96 and permanently attached thereto through which a screw indicated at 98 and dowels indicated typically at 99 pass. The screw 98 and the dowels 99 continue into and are seated in the end closure indicated at 100 of the tube 88. A rib indicated at 101 is permanently attached to the support bar 96. At the rear end of the tube 88 a 45-degree pipe elbow indicated at 102 is mounted thereon. A screw indicated at 103 is inserted through the support bar 96 and threaded into the elbow 102 and supports the rear end of the tube 88.

The support bar 96 terminates in its footed portion shown at 104, said support bar 96 being in turn supported by a screw shown at 105 and three screws indicated typically at 106 and with nuts indicated typically at 107 attached at the end of each screw 106 for the retention of the support bar 96 to an arm portion indicated at 108 integrally attached to the hub portion indicated at 109 of the general support element indicated at 110. The general support element 110 is mounted on the outer races of two antifriction bearings shown at 111 and 112 that encircle the main shaft 58 with their inner races closely fitted thereto. The outer race of the antifriction bearing 111 is fitted into the hub portion 109 of the general support element 110 against the shouldered portion indicated at 113. The outer race of the antifriction bearing 112 is mounted against a shouldered portion indicated at 114 of a closure element indicated at 115 for the hub portion 109 of the general support element 110. A face indicated at 116 of a shoulder portion indicated at 117 is provided on the hub portion 109 for neatly fitting the closure element 115 thereto, and screws indicated typically at 118 are provided for the retention of the closure element 115 on the hub portion 109. Both antifriction bearings 111 and 112 are preferably of the type where a lifetime supply of lubricant is sealed in.

The wash water supply tube 88 and its support structure described above are extended to provide support for a panel indicated at 119 which serves to blank off with a pressure retaining wall that portion of the operationally rotating screening wall 5 between the screen washing position and the position where the screening wall is supplied with a new charge of raw unscreened stock. For this purpose the general support element 110 includes another arm portion indicated at 120 extending from the hub portion 109. Attached to said arm portion 120 by four screws indicated typically at 121 provided with nuts for the end of each one indicated typically at 122 is the footed end portion indicated at 123 of a support bar indicated at 124.

Figures 19, 20:
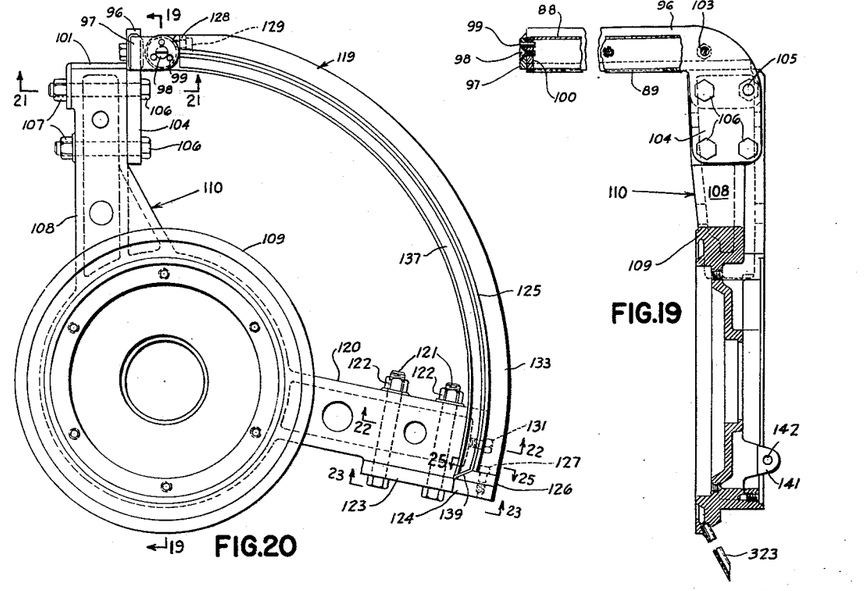
FIG. 19 is a detail view, partly in cross section, of the external wash water tube and the pressure retaining wall with their supporting structures shown in FIG. 3.
FIG. 20 is a front elevation of the structure shown in FIG. 19.
Figures 21, 22, 23, 24, 25, 26:
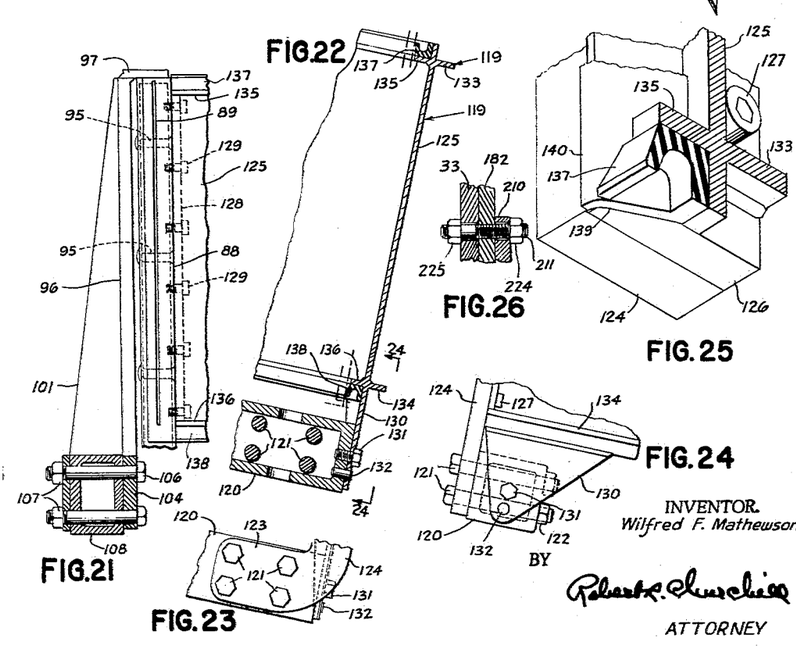
FIG. 21 is a cross sectional view taken on the line 21—21 of FIG. 20.
FIG. 22 is a cross sectional view taken on the line 22—22 of FIG. 20.
FIG. 23 is an end view as seen from the line 23—23 of FIG. 20.
FIG. 24 is a view in side elevation as seen from the line 24—24 of FIG. 22.
FIG. 25 is a perspective view partly in cross section and at a larger scale as seen from the line 25—25 of FIG. 20.
FIG. 26 is a view in cross section, taken at a larger scale, on the line 26—26 of FIG. 4.

The principal part of the panel 119 consists of a portion of cylindrical shell indicated at 125, see FIG. 20, with a flange indicated at 126 at one end of its circumferential extension for attachment to the support bar 124 with screws indicated typically at 127 and with a flange indicated at 128 for attachment to the wash water supply tube 88 by means of the screws shown typically at 129. The cylindrical shell portion 125 is also provided with an extending ear indicated at 130, see FIG. 24, for mounting by means of a screw indicated at 31 and a dowel indicated at 132 directly to the arm extension 120 to increase the stability of the structure. The cylindrical shell portion 125 is provided also with a front rib indicated at 133, see FIG. 22, and a rear rib indicated at 134 extending externally and a matching front rib indicated at 135 and rear rib indicated at 136 extending internally. The front face of the rib 135 and the adjacent internal circumference of the cylindrical shell 125 serve as surfaces to which a seal of conventional type indicated at 137 is cemented. The rear face of the rib 136 and the adjacent internal circumference of the cylindrical shell 125 serve as surfaces to which a seal of conventional type indicated at 138 is cemented. Seals 137 and 138 are both constructed of rubber or other elastomer and serve to seal the panel 119 at its circumferential working edges against the screening wall 5 at its extensions 42 and 43 at either end of its operative length. No seal is required at the edge of panel 119 that is attached to the wash water supply tube 88 because of the wash water that lies between the rotating and stationary parts in this region. At the opposed edge of the panel 119 the flange 126 is beveled, as seen in FIGS. 20 and 25 to provide a face to which the seal indicated at 139 is cemented. This seal 139 is effective at its overhanging lip indicated at 140 which rides on the periphery of the screening wall 5.

Figures 17, 18:
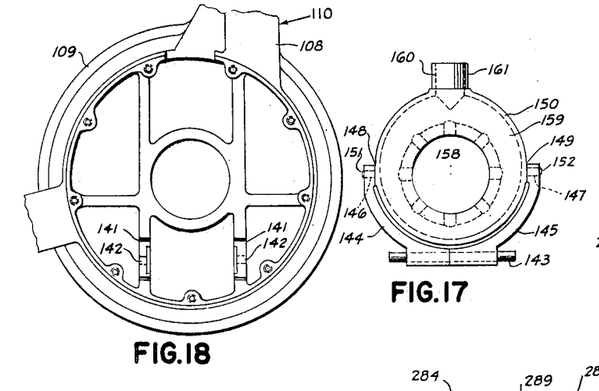
FIG. 17 is a detail view in front elevation of the external wash water supply flow collector.
FIG. 18 is a view in rear elevation of the hub of the structure shown in FIG. 19.

It will be seen in FIG. 18 that two ears indicated at 141 provided each with a hole indicated at 142 extend from the hub portion 109 of the general support element 110. Through these holes 142 the pin indicated at 143, FIG. 17, passes providing a support for the two leverlike arms with separate hubs indicated at 144 and 145. At the other extremities of the two arms 144 and 145 somewhat loosely fitted journal bearings indicated at 146 and 147 and thrust bearings indicated at 148 and 149 provide support of a nature now to be described for the external wash water flow collector body member indicated at 150 at its two pinlike protuberances indicated at 151 and 152. The wash water flow collector body member is the principal part of the wash water collector device 61 previously mentioned.

The collector 150 is partly positioned by its fit between the shaft washers indicated at 153 and 154 mounted on and rotative with the main shaft 58, but it must also be held stationary against the frictional drag of the shaft washers, and its internal diameter must be held approximately coaxial with the main shaft 58. Supplementary support is provided by the journaling in the aforementioned arms 144 and 145 and in a manner that largely assures that the positioning of the collector body member 150 between the shaft washers 153 and 154 shall be free from accidental crowding or cramping as is essential to prevent seizing or premature wear inasmuch as water is the only lubricant practically available at these fits which of necessity must be close in order to prevent undue loss of the wash water confined by these fits.

The wash water enters the collector body member 150 from an annular chamber indicated at 155 lying between said collector and the main shaft. Wash water is received at the chamber 155 from ports indicated typically at 156 passing both through the wall of the hollow main shaft and through an aligned shaft spacing collar indicated at 157, which serves to properly space the shaft washers 153 and 154. The wash water enters the internal ducting of the collector 150 from the annular chamber 155 through collector ports indicated typically at 158.

Provision is made for continuing the flow of wash water through the annular duct indicated at 159 and an exiting duct indicated at 160 both located within the collector 150. Attached at the cylindrical portion of the collector 150, indicated at 161, surrounding the duct 160, is the flexible hose indicated at 162, through which the flow continues, this flexible conduit being provided for the further assurance that the running fit between the collector 150 and the shaft washers 153 and 154 shall be free from accidental cramping. A hose clamp indicated at 163 serves to mount tightly the hose 162 on the cylindrical portion 161 of the collector body member 150. Another hose clamp indicated at 164 serves to mount tightly the other end of the hose 162 to the lower end indicated at 165 of the pipe indicated at 166 through which the flow further continues.

The pipe 166 is engaged into the 45-degree pipe elbow indicated at 167, as is also the pipe indicated at 168, through all of which the flow also continues. The pipe 168 is engaged at its upper end in the 45-degree pipe elbow 102 which has been previously described as a part of the wash water emission tube structure.

The structure to be held stationary within the whole rotative screen structure thus described comprises, with necessary appurtenances, (1) a tube with an elongated slot emitting wash water, the particular stationary position of which has been given as an essential object of this invention; and (2) a pressure retaining wall for which the stationary position described intimately sealing a portion of the exterior of the rotatable screening wall is preferred, for while a pressure retaining wall might be mounted in an equivalent position interiorly of the screening wall, it then might, because of the seals that must be closely fitted to the screening wall, be subject to jamming at such closely fitting elements when, through an accident such as a failure of the wash water supply, an excessive layer of screen retained fiber may be allowed to accumulate, and such jamming could have very serious consequences.

The space provided for this stationary structure, as described, is annular in shape. It is swept out by such rotating elements as the washers 153 and 154 and collar 157 and the rotative parts of the anifriction bearings 111 and 112 all mounted on the rotatable main shaft 58, at which shaft-affixed parts the available space may be said to start; the direct screen drive flange 47 with its closure elements 54 and the indirect screen drive flange 84 where the interposed available space is radial in general description; the cylindrical screening wall 5 with its mounting screws 50 and the cylindrical grid 81 where the interposed available space is cylindrical in general description and a continuation of the aforesaid space of radial description; and the support ring 80 where the available space may be said to terminate.

To stationarily position the confined structure adequately for operational purposes it is necessary not only to maintain it in a coaxial position about the main shaft but also to withhold it from rotation about the main shaft. Essentially, this is by means of a rotatable auxiliary shaft, the axis of which is external to but rotatable with the main shaft. As illustrated, the auxiliary and main shafts are parallel. Thus, the auxiliary shaft indicated at 169 may be said to orbit synchronously with the main shaft 58. As illustrated, the auxiliary shaft is triplicated, there being three auxiliary shafts equally spaced about the main shaft of any one of which the auxiliary shaft is typical. On the typical auxiliary shaft 169 two antifriction bearings, indicated at 170 and 171, are mounted at their inner races. The bearings are of the type provided with a snap ring indicated at 172 inserted in a groove in the periphery of the outer race providing a shoulder seat for the outer race when mounted and are also preferably of the type with attached seals so that a lifetime supply of lubricant may be retained. The outer races of the bearings 170 and 171 are mounted in the hub of the direct screen drive flange 47, one in the hub proper portion 52 in the flange portion 53 thereof, the other in the flange portion 56 of the hub closure element 54. Also on the typical auxiliary shaft 169 two planet gears 173 and 174, here integral with the shaft 169, are shown. The term "planet" is here used in its accepted significance, i. e., with an orbitally moving axis.

Two gears, internal in type, are indicated at 175 and 176, the gear 175 meshing with the gear 173, and the gear 176 meshing with the gear 174. The internal gear 175 is mounted with screws shown typically at 177 in a stationary position coaxial to the main shaft 58 to a gear box indicated at 178 with a core end plate indicated at 179 interposed. The gear box 178 and the core rear end plate 179 are part of a stationary core unit indicated at 180, internal to the screening wall 5, that will be described in detail in another connection. The internal gear 176 is mounted with screws shown typically at 181 to the general support element 110 which it is desired shall be retained in a substantially stationary position although confined within a rotating structure. The geometrical requirement that the internal gear 176 shall be substantially stationary when the internal gear 175 is stationary is that the ratios of the numbers of teeth, i.e., of the pitch diameters, of the planet and internal gear in each of the meshing pairs shall be equal. As here illustrated, the two planet gears on the typical auxiliary shaft are of equal proportions, and the two internal gears with which they are separately meshed are also of equal proportions, obviously meeting the geometrical requirement. As illustrated, the triplicate arrangement of planetary gear shafts, equally spaced about the main shaft, serves to reduce the loading and wear on the planet gears from that which would occur if only a single planetary gear shaft were employed, and it furthermore provides an intrinsically balanced rotating structure. It is apparent that with these three planet gear shafts the planet gears alone would locate coaxially the internal gear 176 and partially stabilize the general support element 110 to which it is attached so that the antifriction bearing 111 might be eliminated, but this is not deemed desirable as it would increase the planet gear tooth loading.

Interiorly of the rotatable screening wall 5 the stationary core unit 180 operationally mounted in a manner that will be described onto the inner face plate portion 33 of the front end portion 8 of the casing 3 is provided. The stationary core unit 180 consists of a front end plate indicated at 182 located interiorly of the front end of the cylindrical screening wall 5 and a rear end plate 179, previously mentioned, located interiorly of the rear end of the cylindrical screening wall 5 with interposed and attached members as presently will be described.

Surrounding a portion of the main shaft 58 is a tube member indicated at 183 with attached flanges that is part of the core unit being interposed between the front end plate 182 and the gear box 178. The tube member 183 serves as a guide for the insertion of the main shaft 58 and as a means for confining lubricant and as a structural support member. The front flange indicated at 184, permanently attached to the tube 183, is located on the front end plate 182 with studs indicated typically at 185 that are threaded continuously from a seating position in the front end plate 182 to their rear ends. Said threaded rear ends extend through unthreaded clearance holes in the front tube flange 184 and through nuts indicated typically at 186 which serve to retain the tube flange 184 against the front core end plate 182. At their front ends unthreaded portions of the studs 185 pass through the hub portion 34 of the end portion 8 of the casing 3 to a terminal portion threaded to receive nuts indicated typically at 187. The studs 185 thus assist in locating together, and the nuts 187 assist in binding together the end plate 182 and thus the whole core unit 180 to the inner face plate portion 33 of the housing 3 when assembled for screen operation. The rear flange indicated at 188, permanently attached at the rear end of the tube 183, is mounted with screws indicated typically at 189 to the gear box 178 which with its closure indicated at 190 is in turn mounted to the rear end plate 179 in a manner that will presently be described.

The screws 177 have been described as mounting the internal gear 175 to the stationary core unit 180. As will be seen in FIG. 3, the screws 177 pass through the core rear end plate 179 and through the gear box closure 190 as well as through the gear 175 adjacent to the head portion of the screws and terminate as threaded into the gear box 178, thus binding all four, 175, 179, 190 and 178, together. A shouldered portion indicated at 191 of the internal gear 175 accurately locates it on the gear box 178. The gear box 178 and its closure 190 are also mounted to the core rear end plate 179 with three supplementary screws indicated typically at 192.

Figure 8:
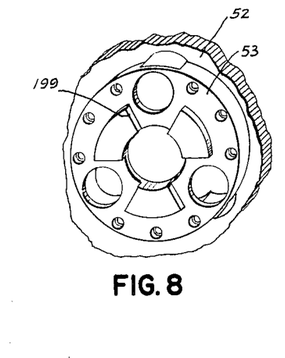
FIG. 8 is a perspective view of the front side of the hub, broken out, of the direct screen drive flange.

The gear box 178 contains two stages of speed reducing gearing for the driving of the rotatable screen structure 4. The final or output gear indicated at 193 is provided with a central hole for the admission of the main shaft 58 and a hub extension indicated at 194 where it mounts the inner race of an antifriction bearing indicated at 195. The outer race of the antifriction bearing 195 is mounted in the bear box 178. At the other end of the gear 193 is a hub extension indicated at 196 which passes through a stationary oil retention seal indicated at 197 of conventional design mounted in the gear box closure 190. Jaw clutch teeth indicated at 198 are provided for engagement with the jaw clutch teeth indicated at 199, see FIG. 8, at the hub portion 52 of the direct screen drive flange 47 which is rigidly attached to the main shaft 58, thus providing a positive drive for the general rotative screen structure 4, yet also providing for its easy removal from the casing 3.

The output gear 193 is driven by a pinion gear indicated at 200 which engages it. The pinion gear 200 is here shown integral with its shaft indicated at 201. The shaft 201 is fitted to the inner races of antifriction bearings indicated at 202 and 203 which serve to support the shaft 201. The outer race of the bearing 202 is seated in the gear box 178, and the outer race of the bearing 203 is seated in the gear box closure 190. Also shown integral with the shaft 201 is the gear 204 of another stage of speed reducing gearing. The gear 204 is driven by the pinion gear indicated at 205 which engages it. The pinion gear 205 is here shown integral with the drive shaft indicated at 206 which is fitted, adjacently to the pinion gear 205, to the inner race of an antifriction bearing indicated at 207 that provides support for this end of the drive shaft 206. The outer race of the antifriction bearing 207 is seated in the gear box 178.

The drive shaft 206 extends forwardly through and beyond the core unit 180, from the gear box 178 to a position where, see FIG. 3, the shaft is reduced in diameter to permit the mounting of the inner race indicated at 208 of a roller bearing indicated at 209 with an outside diameter of said inner race 208 approximating the diameter of the shaft 206 as it extends forwardly from the gear box 178. This construction is optional as the shaft itself, if properly prepared, might serve as the inner race of the roller bearing 209. The outer race of the bearing 209 is mounted in a support member indicated at 210. The support member 210 is attached to the core end plate 182 with studs indicated typically at 211 in a manner that will be described in greater detail at another point. From the bearing 209 the shaft 206 extends forwardly through a shaft seal indicated at 212 of conventional type seated in a closure indicated at 213 for the support member 210 into which said closure is threaded.

The shaft 206 extends further forwardly to mount a pulley indicated at 214 at a taper portion of the shaft 206 and a retaining nut therefor indicated at 215. The pulley 214 serves to drive the shaft 206 to which it is mounted with the assistance of a key indicated at 216. The pulley 214 may be adapted for a V-belt, such as that indicated at 217, to drive it, such V-belt being driven in turn by a pulley such as indicated at 218 mounted on the shaft of an electric motor indicated at 219, said motor being mounted with nutted studs indicated typically at 220 to the casing body member 6.

Figures 5, 6, 7:
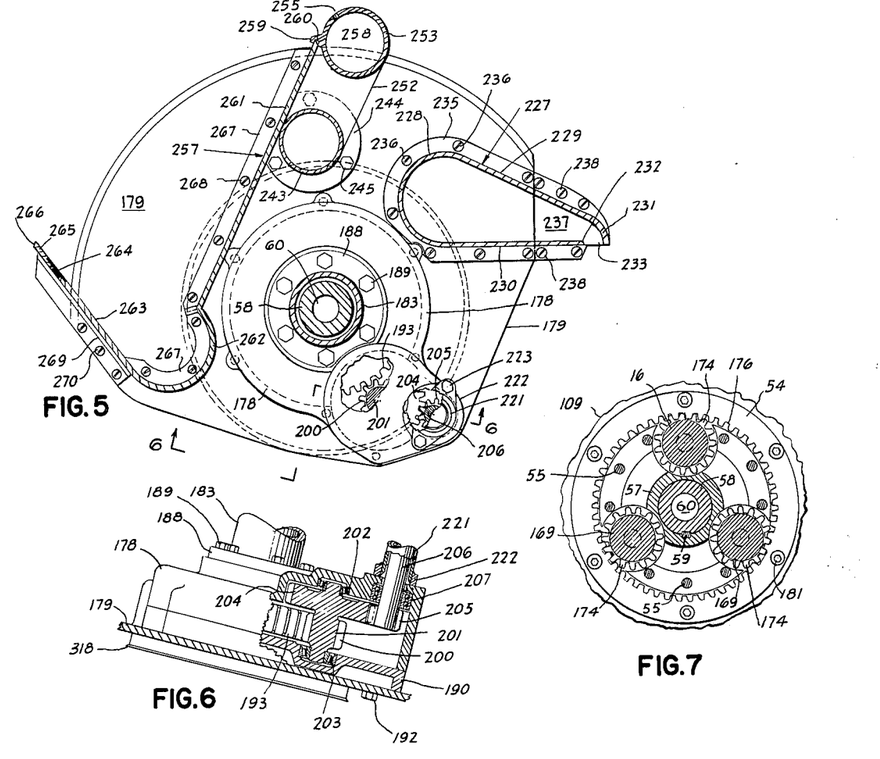
FIG. 5 is a view in cross section taken on the line 5—5 of FIG. 3, with small portions broken out to show the meshing of the two pairs of driving gears.
FIG. 6 is a view of the drive gear box sectioned on the line 6—6 of FIG. 5.
FIG. 7 is a cross section taken on the line 7—7 of FIG. 3.

A portion of the drive shaft 206 is surrounded by a flanged tube indicated at 221 to confine the lubricant used for the shaft bearings and to assist in the stabilization of the whole core unit 180. As illustrated in FIG. 5, a flange indicated at 222 permanently attached at the rear end of the tube 221 is attached to the gear box 178 with screws indicated typically at 223. The front end of the tube 221 is permanently attached as by welding or brazing to the support member 210.

As aforesaid, the support member 210 is attached to the core end plate 182 with the studs 211. As will be seen in part in FIG. 26, the studs 211 are seated in the front core end plate 182 with a threaded portion of the studs that extends rearwardly through unthreaded clearance holes in an outwardly extending flange portion of the support member 210 through nuts indicated typically at 224 that retain the support member 210 to the front core end plate 182. The studs 211 extend forwardly through clearance holes in the inner face plate portion 33 and at threaded end portions through nuts indicated typically at 225 that serve to assist in binding the front core end plate 182 and thus the whole core unit 180 to the inner face plate portion 33 of the front end portion 8 of the casing 3.

To provide an inlet for the raw unscreened stock, as receivable through the adapter pipe 37 located at the front end portion 8 of the casing, a round hole indicated at 226 is provided in the front core end plate 182 aligned with said adapter pipe 37. Surrounding the hole 226 is a conduit indicated at 277 extending between the core end plates 182 and 179, as will be seen in FIGS. 4 and 5. The conduit 227 consists in part of a portion only indicated at 228 of cylindrical wall, its circumference being limited to provide a large side port. Flat walls indicated at 229 and 230 serve as wall continuations of the portion of cylindrical wall 228, being permanently attached thereto and serving to confine the flow issuing from said large side port of the cylindrical wall portion 228. The wall 229 continues at its outer extremity with a portion of small cylindrical wall, indicated at 231, that is permanently attached to the wall 229. The wall 230 continues to a rounded edge indicated at 232.

The cylindrical wall portion 231 cooperates with the rounded edge 232 to form an elongated slot nozzle indicated at 233. A typical pulp stream from this nozzle is indicated at 234.

As seen in FIG. 5, the conduit 227 is provided with a continuous flange portion indicated at 235 permanently attached to the conduit at the rear end thereof for mounting said conduit 227 to the rear core end plate 179 by means of seven screws shown typically at 236. The rear end plate 179 serves as a partial closure for the conduit 227. For reasons of machining convenience a supplementary plate indicated at 237 is used to complete the rear end closure of the conduit 227. The supplementary closure plate 237 is retained to the flange 235 with five screws indicated typically at 238.

Figures 4, 4A:
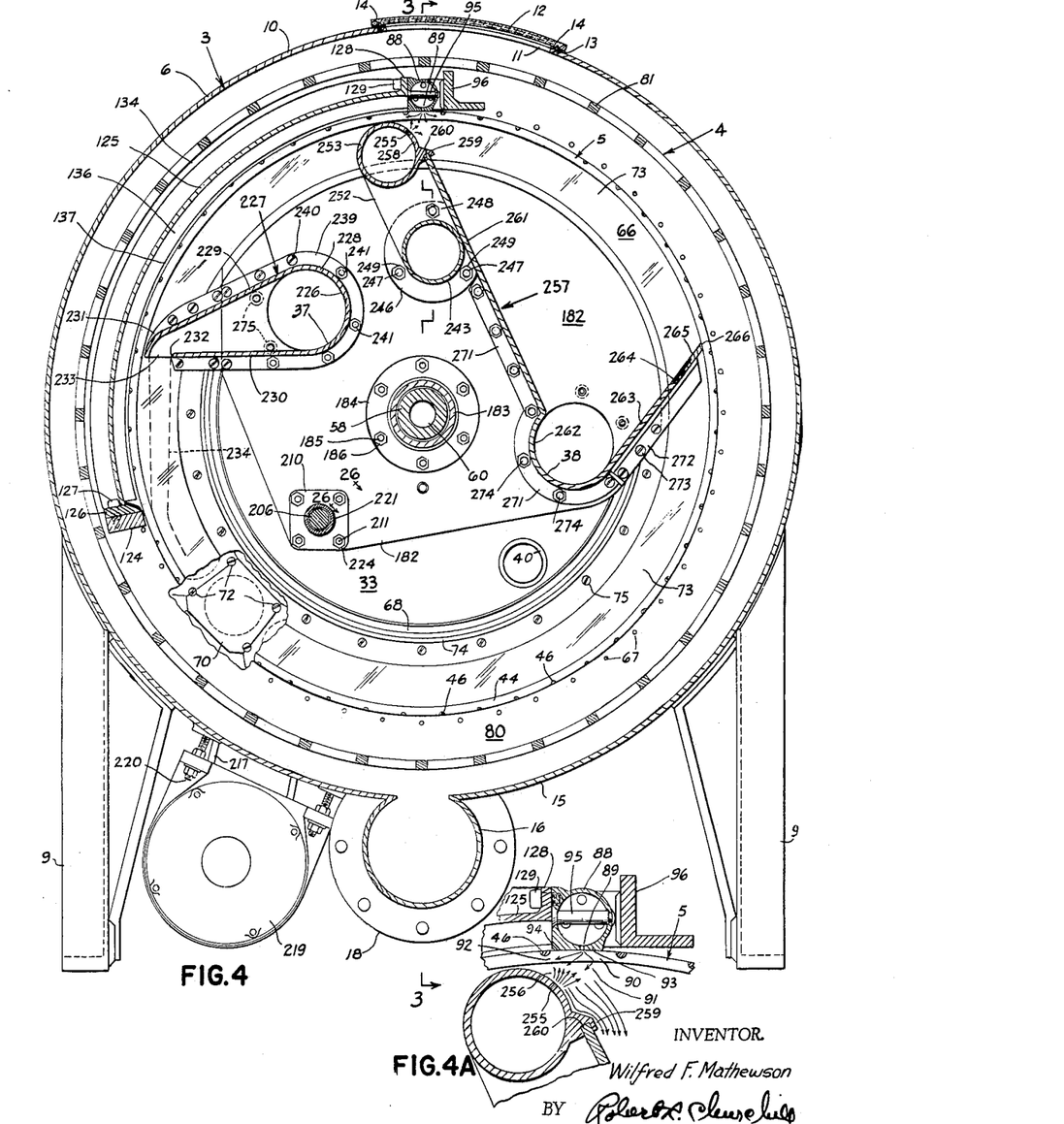
FIG. 4 is a view in cross section taken on the line 4—4 of FIG. 3, with a small portion broken out to show a typical window mounting on the housing.
FIG. 4A is a cross sectional detail view at a larger scale of a portion of the machine shown in FIG. 4.

As seen in FIG. 4, at its front end the conduit 227 is similarly provided with a continuous flange portion indicated at 239 that is also permanently attached. Mounting the conduit flange 239 to the front core end plate 182 are four screws indicated typically at 240 and four studs indicated typically at 241. The stud mountings are of the type of the stud mounting shown in FIG. 26, but here with some differently identified parts. In the present construction the illustrated stud would be the aforementioned 241 type, and the flange the aforementioned conduit flange 239, other parts remaining as previously identified, and the construction remains the same in that a generalized flange is retained against the front core end plate 182, and said front core end plate is separately retained against the inner face plate portion 33.

As an inlet for the internal screen shower water as receivable through the adapter pipe 39 located in the front end portion 8 of the casing 3, a round hole matching the inside diameter of said adapter pipe located in the front core end plate 182 is provided as indicated at 242. Aligned with the round hole 242 is a pipe indicated at 243 extending between the front core end plate 182 and the rear core end plate 179 as will be seen in FIGS. 3, 4 and 5. The pipe 243 is provided with a permanently attached flange at its rear end as indicated at 244, and screws indicated typically at 245 are provided for attaching said pipe at its flange 244 to the rear core end plate 179. The pipe 243 is also provided with a permanently attached flange at its front end indicated at 246, and for mounting this flange to the front core end plate 182 two studs indicated at 247 and one stud indicated at 248, and three nuts for the studs 247 and 248 as indicated at 249. The studs 247 and 248 have threaded portions that extend rearwardly from a threaded seat in the front core end plate 182 through clearance holes provided in the flange 246 and through the nuts 249 whereby the flange 246 may be drawn tightly to the front core end plate 182. When the core unit 180 is assembled in the casing 3 the studs 247 extend forwardly through clearance holes in the inner face plate portion 33 of the front end portion of the casing 3 and through the nuts indicated at 250 that the front core end plate 182 may be drawn tightly to the inner face plate portion 33 of the housing, and assistance is also given to the stable mounting of the whole core unit 180. The stud 248 serves similarly but owing to the position at which it penetrates the inner face plate portion 33, it extends forwardly through a reinforced portion indicated at 251, FIG. 1, of the cylindrical portion 32 of the end portion 8 of the casing 3 before providing a nut of the type 250.

Extending generally upwardly from the pipe 243 are two side outlet pipes indicated at 252 permanently attached. These two pipes 252 are also attached to the internal wash shower pipe indicated at 253 so that this shower pipe 253, incidentally, serves as a header to collect the flow receivable from the pipe 243 through the two pipes 252 serving as junction pipes. The shower pipe 253 is mechanically supported by the two junction pipes 252.

The shower pipe 253 is provided with end closures indicated at 254 permanently attached so that all the wash water received is emitted through the row of spray holes indicated at 255. The spray holes 255 are so located that the issuing spray indicated at 256 flushes the inner or screening face of the cylindrical screening wall 5 cooperatively with the backwash flow 91 previously described from the screen external wash water tube 88 to flush away accumulated fibers and other coarse or foreign material from the screening face.

A trough indicated generally at 257 is provided for the collection of materials flushed from the interior of the screening wall together with the associated flushing water. The boundaries of said trough will presently be described. At one side the trough starts at the top of the internal shower pipe 253 with a portion indicated at 258 of the shower pipe wall through which the shower water is emitted. Permanently attached to the shower pipe 253 is a narrow riblike protrusion indicated at 259 which is provided with a recess indicated at 260. The trough wall continues to and over the protrussion 259. The recess 260 engages a major trough side panel indicated at 261. At its lower extremity the panel 261 is permanently attached to a circumferential portion of pipe indicated at 262 that serves as a continuation of the trough wall continues to and over the protrusion 259. extremity to the opposed side of the circumferential pipe portion 262 is another trough side panel indicated at 263 continuing the trough side wall to a flexible connection element indicated at 264 of rubber or equivalent material, and thence to a flap portion of rigid material indicated at 265. The rubber portion 264 is here shown cemented or vulcanized to recessed edge portions of both the panel 263 and the flap 265. With this arrangement a substantially continuous side wall to the trough is obtained, yet a retractable flap is provided that will permit the passage of the screening wall 5 by the flap edge indicated at 266 even when a thick layer of retained material lies on the interior of the screening wall 5. Sufficient clearance is provided between the edge 266 and the screening wall 5 that the flap is not disturbed by a screen-retained layer of normal thickness. In its normal operating position the flap 265 is at its ends supported by, but not attached to, extensions of flanges supporting the panel 263. The system of trough wall supporting flanges will presently be described.

At the rear end of the trough 257 provision is made for an end flange indicated at 267 permanently attached to the circumferential portion of pipe 262 at the internal side thereof and continuing through a welded joint as a flange for the panel 261 to which it is also permanently attached. Screws indicated typically at 268 retain the flange 267 and, therefore, the trough wall portions 262 and 261 to the core rear end plate 179. At the rear end of the panel 263 a flange consisting of angle iron, here external to the trough and permanently attached thereto indicated at 269, is provided, and screws indicated typically at 270 serve to retain the flange 269 and thus the panel 263 onto the core rear end plate 179. The flange 269 is extended to provide a seat for the rear end of the flap 265.

At the front end of the trough 257 provision is made for an end flange indicated at 271 permanently attached to the circumferential portion of pipe 262 at the external side thereof and continuing as a flange for the panel 261 and permanently attached thereto but not extending the full width thereof. In the opposite direction, attached by welding, the flange continues as angle iron portion indicated at 272 permanently attached to trough side panel 263, and furthermore extending to provide a seat for the flap 265. Adjacent to the side panel 263 the flange 271 at its extension 272 is attached to the core front end plate 182 with screws indicated typically at 273. Adjacent to circumferential portion of pipe 262 and the panel 261 the flange 271 is attached to the core front end plate 182 with stud mountings generally of the type shown in FIG. 26, but here again with some differently identified parts. In the present construction the studs are identified as 274, and the flange is the aforementioned flange 271, other parts remaining as previously identified, and the construction remains the same in that a generalized flange is retained against the front core end plate 182, and said front core end plate is separately retained against the inner face plate portion 33.

In addition to the various nutted studs mounting the front core end plate 182 to the inner face plate portion 33, two flat head screws indicated at 275, FIG. 4, also serve in the same capacity. They are seated in the inner face plate 33, and their threaded portions are engaged in the front core end plate 182. They serve particularly to prevent leakage between the two parts that they join from the adjacent raw stock conduit.

The screen external wash water is receivable at the whole screen unit from external sources at a pipe elbow indicated at 276 that is attached at its flange extension indicated at 277 by screws indicated at 278 to a mounting block indicated at 279 permanently attached at the interior of the cylindrical portion 32 of the front end 8 of the housing 3. The external wash water flow continues operationally through a pipe indicated at 280 that is engaged at its lower end in the elbow 276. Thence, the wash water flow continues through a flexible hose coupling indicated at 281 that is clamped to the exterior of the pipe 280 with a hose clamp indicated at 282. A similar clamp secures the hose coupling 281 to a cylindrical extension indicated at 283 of a shell member indicated at 284 so that the wash water flow may continue through the centrally disposed hole of the cylindrical extension 283 into a chamber indicated at 285 within the shell member 284. The shell member 284 is closed at its front end by a disk indicated at 286 that is secured to the shell member 284 with screws indicated typically at 287. Similar screws retain a washer element indicated at 288 to the rear end of the shell member 284. A shaft collar indicated at 289 is neatly fitted between the disk 286 and the washer 288 with clearances suitable for use with water as a lubricant.

The materials of which the shaft collar 289 and the shell closure elements comprising the disk 286 and the washer 288 are constructed are selected for corrosion resistance and non-galling characteristics in the combinations indicated.

Figure 11:
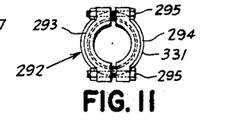
FIG. 11 is a front view of the clamp for the retention of the front extension of the screen shaft with an adjacent shaft collar.
Figure 12:
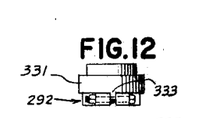
FIG. 12 is a plan view of the clamp shown in FIG. 11.
Figure 13:
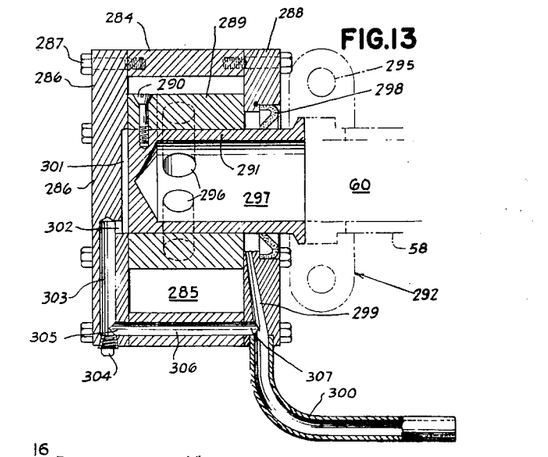
FIG. 13 is an enlarged cross sectional view of a portion of the section shown in FIG. 3 at the front and extension of the main shaft.

As shown in FIG. 13, the shaft collar 289 is attached by means of a screw indicated at 290 to a hollow main shaft extension member indicated at 291 which is operationally attached to the main shaft 58 by means of a split coupling collar indicated generally at 292, see also FIGS. 11 and 12, consisting principally of the two halves indicated at 293 and 294 and two clamping screws indicated at 295 which in clamping the split collar 292 to the main shaft 58 and the shaft extension member 291 draw both the main shaft 58 and the shaft extension member 291 together by means of a taper fit, here shown only between the collar 292 and the shaft extension member 291, although alternatively the taper fit might be between the collar 292 and the main shaft 58 or at both locations.

The shaft collar 289 and the shaft extension member 291 are provided with aligned radial holes serving as ports indicated typically at 296 so that the wash water under pressure in the chamber 285 may exit thereby into the hollow indicated at 297 of the shaft extension member 291 and thence into the adjoining central passage 60 of the main shaft 58. The hollow 297 opens only to the main shaft abutting end of the shaft extension member 291, the other end being closed off as illustrated.

As will be seen in FIG. 13, provision is made for any water leakage that may occur by the face of the collar 289 that rotates closely to the stationary washer 288, said leakage being retained by the seal indicated at 298, in that a radial hole indicated at 299 is provided whereby any such leakage is ducted into a drain tube indicated at 300 that extends through the end member 8 of the casing where, as it issues therefrom, the leakage water is allowed to mingle with and thus dilute slightly, in normal operation, the screen-passed fraction of the pulp.

Provision is also made for any water leakage that may occur by the face of the collar 289 that rotates closely to the stationary disk 286 in that a passage is provided so that this leakage also is directed into the drain tube 300. This passage consists of a recess indicated at 301 in the end disk 286 where the leakage flow is collected; a hole indicated at 302 penetrating further into the end disk 286; a radial hole in the disk 286 indicated at 303 closed at its outer end by a threaded plug indicated at 304; a side outlet hole indicated at 305 from the radial hole 303 extending to the inner face of the disk 286; a hole aligned with the hole 305 indicated at 306 traversing the shell member 284; and a hole indicated at 307 extending from the front face of the washer 288 in an aligned position with the hole 306 in the shell member 284 to the hole 299 in the washer 288 where the flow is allowed to mingle with the leakage flow previously described.

It is essential that the faces of the disk 286 and the washer 288 where operative against the collar 289 shall there float freely on a thin film of water without cramping or crowding that might squeeze out this thin film of water and cause premature wear or galling. On the other hand it is necessary to hold the structure consisting of the disk 286, the washer 288 and the interposed shell 284 as retained together free from rotation and in a proper coaxial position with reference to the main shaft 58. For this purpose two pinlike protuberances indicated at 308, see FIG. 1, are provided on the exterior of the shell 284 for engagement, with appropriate looseness, in the holes provided, one each at the extremities of two link arms indicated at 309 and 310, mounted with extended hubs on a pin indicated at 311 and interposed between two pin support arms indicated at 312 of a bracket indicated at 313 attached with screws indicated at 314 to the exterior face of the inner face plate portion 33 of the casing 3. The pin 311 is provided with holes near its extremities for the insertion of cotter pins indicated at 315 for the retention of the pin 311. To further stabilize the positioning of the shell 284 loosely fitted bearing faces are provided at 316 on both the shell 284 and the links 309 and 310, and a long bearing is provided at the hubs of the links as located on the pin 311.

In FIG. 3 it will be seen that provision has been made for the removal from the casing 3 of excess lubricant as may leak or drip from various gears or bearings and also for the removal of irregularly splashed water. At the front bearing 35 of the main shaft 58 an oil seal ring indicated at 317 is inserted in the hub portion 34 of the inner face plate 33, and any leakage from the seal 317 occurs external to the casing. At the rear of the bearing 35 the main shaft 58 is solidly confined as far as the gear box 178 by the front core end plate 182 and the tube 183. Similarly forwardly of the front bearing 209 on the drive shaft 206 the oil seal 212 is seated in a closure 213 for the bearing support member 210, and any leakage from the oil seal 212 occurs externally to the casing. At the rear of the bearing 209 the drive shaft 206 is solidly confined by the support member 210 and the tube 221 permanently attached thereto as far as the gear box 178.

The oil seal ring 197 is mounted in the gear box closure 190. As will be seen in FIG. 3, any leakage from the seal 197 tends to drain down onto the stationary internal gear 175, and this leakage together with any excess lubricant on the internal gear 175 will tend to drain down to the sharp edge indicated at 318 provided on the exterior of the internal gear 175. Thence it may drip into a small annular trough indicated at 319 provided on the front face of the rotatable direct screen support flange 47. Holes indicated typically at 320 are provided to drain the trough 319 through the flange 47, the holes being somewhat outwardly directed. At the rear face of the flange 47 the oil leakage flow may drain centrifugally or gravitationally to the oil slinging edge indicated at 321, here shown provided directly on the flange 47.

An annular trough indicated at 322 provided in the hub portion 109 of the internal general support element 110 serves to collect any lubricant slung from the slinging edge 321 as well as any excess lubricant from the internal gear 176 and the bearing 111 as may drain across the face of the internal gear 176 and the general support element 110. A drain tube indicated at 323, mounted in the general support element 110, is provided for the removal of the various leakage fluids from the trough 322. The flow through the drain tube 323 falls from the lower end of the tube into another trough indicated at 324 provided in the front or interior face of the rotatable indirect screen support flange 84 and thence flows through holes indicated typically at 325 extending in a somewhat radial direction from the trough 324 through the support flange 84. The flow emitting from the holes 325 thence traverses under centrifugal or gravitational forces across the face of a lip indicated at 326 protruding from the rear or outer face of the indirect screen support flange 84 to a slinging edge indicated at 327. The flow from the slinging edge 327 is collected in an annular trough indicated at 328 permanently attached to the door or closure element 20 for the rear casing end portion 7. A hole indicated at 329 is provided in the closure element 20 for the removal from the casing of the lubricant leakage flow or the accumulation thereof. A threaded closure indicated at 330 is provided for the hole 329. While lubricant leakage has here been solely considered, it is obvious that the same drainage system may also provide drainage for splashed or overflowed water or pulp if the occasion demands it.

When the rotatable screen structure 4 is removed from the casing 3 it is removed with the enclosed operationally stationary structure intact. Before removal of the screen structure 4 from the casing 3 through the door aperture 19 it is necessary to free the closure element 66 by releasing the screws 67 retaining it to the support ring 80 at the front of the support grid 81. Access to the screws 67 is gained through the hole 28 as aforesaid. It is also necessary to remove the split coupling collar 292, see also FIGS. 11 and 12, and free the thrust bearing collar indicated at 331 behind the split coupling collar 292 as the thrust bearing collar 331 together with the split coupling collar 292 serve to retain the main shaft 58 and thus the whole rotatable screen structure unit 4 in an operating position. The thrust bearing collar 331 operates against an inwardly extending flange indicated at 332 in the hub portion 34 of the inner face plate portion 33 of the front end of the casing. A lug indicated at 333 integral with the collar 331 engages the split collar 292, see FIG. 12, insuring that the collar 331 shall rotate positively with the main shaft 58 although loosely fitted thereto for convenience of assembly and disassembly.

The main shaft is removable with the inner race indicated at 334 of the roller bearing 35 intact. The outer race and the roller assembly of the roller bearing 35 need not be removed for the removal of the screen structure 4 from the casing. The hub portion 52 of the direct screen drive flange 47 rigidly attached to the main shaft 58, as aforesaid, is separable from the drive gear 193 by means of the jaw clutch teeth 199 provided on the hub portion 52, see FIG. 8, of the direct screen drive flange 47 disengageable from similar jaw clutch teeth provided on the drive gear 193 to facilitate the removal of the screen structure 4 from the casing 3.

It will be understood that references to the flow of screen-passed material or screen-passed fraction of the pulp delivered to the cylindrical portion 15 of the casing and collected in the pipe 16 also includes the incidental wash water additions thereto.

From the above description it is believed that the operation of screening the pulp material will be apparent. The raw pulp stock to be screened is admitted into the machine from a bulk supply thereof to the raw stock inlet adapter pipe 37 and through the conduit 227 and nozzle 233 to flow in a sheet extending nearly the full width of the screen 5 and to fall by gravity onto the interior surface of the screen wall. The acceptable portions or screen-passed fraction of the pulp, together with the wash water additions, pass through the screen wall onto the interior portion 15 of the casing to be collected in the pipe 16 from which it is discharged to a suitable storage tank or to other machines for further processing.

In the illustrated embodiment of the invention the interior of the screen unit 5 may be pressurized to augment the gravitational and centrifugal flow of the acceptable portions of the pulp through the screen by a connection to a source of air under pressure to the adapter pipe 40 extending into the wall 182, the pressurized area being defined by the stationary wall 182, the rotating annular wall 66 in sealed engagement with the stationary wall at the front end, and the direct drive flange 47 at the other end of the screen. Thus, in operation since some air may incidentally pass through the screening slots to the area exterior of the screen, the hole 30 in the wall 27 provides a vent therefor. Alternatively, the space between the exterior of the screen wall and the interior of the casing may be placed under a reduced pressure for the same purpose by providing a vacuum connection to the opening 30 and using the opening 40 as a vent as described.

The external wash or flushing water is supplied by a connection to the inlet elbow 276 to flow through the coupling or transfer device 63, central opening 60 in the shaft 58, then through the coupling or transfer device 61 and piping 62 to the wash water emitting tube 88 to be delivered through the slot 89 to the exterior of the screen wall 5 to provide a back wash. It will be observed that the coupling units 61, 63 are supported in a novel manner such as to avoid inadvertent cramping or binding of the rotary and stationary elements as may be caused by thermal expansion of the elements while maintaining a substantially liquid-tight seal between the elements.

The internal wash or flushing water enters through a connection to the adapter pipe 39 and flows through the connecting pipes 252 to the internal wash shower pipe 253 through the spray holes 255 where it cooperates with the back wash flow from the external wash water emitting tube to flush away accumulated fibers and other coarse or foreign material as described. As also described, the flushed away material is received in the trough 257 and collected and discharged through the pipe 38 which may be arranged to convey the material to a machine for further processing or to be discharged as waste material. The provision of an external and internal wash serves to thoroughly and efficiently back wash the screening slots and to flush the screen wall both externally and internally in an efficient manner.

It will be further observed that the portion of the screen wall 5 between the wash water emitting elements and the point at which the raw stock is delivered to the interior of the screen is covered by the arcuate wall 125 in sealing engagement with the rotating screen which comprises a pressure retaining wall for the purpose of preventing pressurized air from passing through the washed portion of the screen.

It will also be seen that the present structure of machine for treating pulp stock has novel provision for the removal of lubricant leakages from the casing whereby to prevent contamination of the screened pulp by such leakage. Also, the manner of assembling the screen structure provides for the removal of the entire screening structure 4, except for separately detachable items noted but with the enclosed operationally stationary structure intact, from the casing 3 through the aperture 19.

While, for the purposes of illustration, but not by way of limitation, I have described above and shown in the drawings the apparatus as it might be used for screening pulp stock and as having a screening wall 5 that contains the exact requirements of a fractionating screen which passes the acceptable fiber, yet it is within the scope of the invention to use the structure as a filter for the purpose of thickening screened stock and/or recover suspension fluids. This would involve substituting for the particular screening wall shown, or its nearest equivalent in a conventional slotted screen, any commercially available screening element which is adapted for a rotary screen and has the proper construction to function as a filter.

While the preferred embodiment of the invention has been herein illustrated and described, it will be understood that the invention may be embodied in other forms within the scope of the following claims.

Having thus described the invention, what is claimed is:
1. In a machine for treating a suspension of solids in a liquid, in combination, a casing, a screening structure supported for rotation within said casing, said screening structure comprising a cylindrical screen wall and a cylindrical support grid concentric with and spaced out- wardly from said screen wall providing an annularly continuous circumferential space therebetween, a shaft mounted for rotation within said casing, axially spaced supporting flanges mounted on and for rotation with said shaft and connected to one end of said screen wall and said support grid respectively and defining a radial circumferentially continuous space therebetween in communication with said annular space, an annular supporting ring connecting the other ends of said screen wall and said support grid and closing that end of the annular space, a washing fluid emitting tube disposed within said annular space, washing fluid supply connections coupled to one end of said tube extending through said radial space, and means for stationarily supporting said tube and the supply connections within said annular and radial spaces.

2. The combination as defined in claim 1 wherein the washing fluid emitting tube is supported in close proximity to the exterior of said screening wall during rotation of the screening structure and providing a back washing flow, and a shower pipe stationarily supported within said screen wall providing an internal shower cooperating with said back washing flow to flush the screen wall of retained material.

3. In a machine for treating a suspension of solids in a liquid, in combination, a casing, a shaft mounted for rotation in the casing, a screen structure mounted on said shaft, said screen structure comprising a cylindrical screen wall having a disk supporting member at one end, a cylindrical support grid concentric with and spaced outwardly from said screen wall providing an annularly continuous circumferential space therebetween, a second supporting member connected to the adjacent end of said support grid and spaced laterally outwardly from said first disk defining a radial circumferentially continuous space therebetween in communication with said annularly continuous circumferential space, an annular supporting ring connecting the other ends of said screen wall and support grid, a washing fluid emitting tube disposed in said annularly continuous circumferential space, means for supplying fluid under pressure to one end of said tube including a central passageway in said shaft adapted for connection to a source of supply exterior of the casing, said shaft being provided with radial openings adjacent said radial circumferentially continuous space, stationary coupling means surrounding the shaft in communication with said radial openings, piping connections between said coupling means and said tube extending through said radial circumferentially continuous space, and means for stationarily supporting said tube and said supply connections within said space during rotation of the screening structure.

4. The combination as defined in claim 3 wherein the screen structure is arranged to be detachably removed through an opening at one end of said casing and which includes a removable closure for said opening, a fixed circular wall at the other end of the casing, an annular wall detachably connected to said screen wall and in detachably sealing engagement with the periphery of said fixed circular wall, a detachable connection between the fluid supply end of said shaft and said fluid suply means, and drive means for the screen structure including disengageable driving connections between said drive means and the screen structure.

5. The combination as defined in claim 3 wherein the means for supplying fluid under pressure further includes a similar stationary coupling means in communication with other radial openings in the shaft for admission of fluid into said shaft.

6. The combination as defined in claim 3 wherein the coupling means comprises a hollow body member surrounding the shaft, said body member having an annular chamber and provided with an opening of larger diameter than the shaft and in substantially coaxial alignment therewith, said body member having opposed marginal bearing faces about said opening, means carried by and rotatable with said shaft having bearing faces cooperating with the bearing faces on said body member enclosing said chamber and providing a substantially fluid-tight seal, said chamber having an outlet, said piping connections including a flexible conduit connected to said outlet, and means for supporting said body member in substantially coaxial alignment with said shaft in a manner such as to permit self-alignment of said rotary and stationary bearing faces free of cramping or binding so as to maintain a film of fluid as a lubricant between said bearing faces.

7. The combination as defined in claim 6 wherein the means for supporting the hollow body member includes a stationary support, a pair of opposed pivotally mounted and independently movable links carried by said support, the other ends of said links being pivotally connected to diametrically opposed sides of said body member, said pivotal connections and the engaging faces of the links and the body member being relatively loosely fitted whereby to permit relative movement of said links and self-alignment of said bearing faces while maintaining the body member in coaxial alignment with the shaft.

8. In a machine for treating a suspension of solids in a liquid, a casing, a screening structure supported for rotation on a horizontal axis within said casing, said screening structure comprising a cylindrical screen wall and a cylindrical support grid concentric with and spaced outwardly from said screen wall providing an annularly continuous space therebetween, a shaft mounted to rotate within said casing, axially spaced supporting elements mounted on said shaft for rotation with said shaft and connected to one end of said screen wall and an adjacent end of said support grid respectively defining a radially continuous space between the supporting elements in communication with said annularly continuous space, an annular supporting member connecting the other ends of said screen wall and said support grid and closing that end of the annularly continuous space, a washing fluid emitting tube disposed within said annularly continuous space arranged in close proximity to the exterior of said screen wall providing a back washing flow, a supply pipe connected to said tube and extended through said radially continuous space, means for stationarily supporting said washing fluid tube and supply pipe within said space during rotation of said screening structure, a shower pipe stationarily supported within said screen wall providing an internal shower cooperating with said back washing flow to flush the screen wall of retained material, and means for collecting and discharging said flushed material.

9. In a machine for treating a suspension of solids in a liquid, in combination, a casing, a screening structure supported for rotation within said casing, said screening structure comprising a cylindrical screen wall and a cylindrical support grid concentric with and spaced outwardly from said screen wall providing an annularly continuous space therebetween, a shaft mounted for rotation within said casing, axially spaced supporting flanges mounted on said shaft for rotation with said shaft connected to one end of said screen wall and said support grid respectively and defining a radially continuous space therebetween in communication wtih said annular space, an annular supporting ring connecting the other ends of said screen wall and said support grid and closing that end of the annularly continuous space, a washing fluid emitting tube disposed within said annular space, washing fluid supply connections coupled to one end of said tube extending through said radial space, means for stationarily supporting said tube and the supply connections within said communicating spaces, stationary means circumferentially spaced from said washing fluid emitting tube for delivering unscreened pulp onto the interior face of said rotatable screen wall in the form of a free-falling sheet, means for pneumatically pressurizing the interior of the screen wall to increase the passage of the acceptable portions of the pulp through the screen wall, and a stationary pressure retaining wall also disposed in said annular space having portions in sealing engagement with the exterior of the screen wall in an area between said washing fluid tube and a point adjacent the point of delivery of the unscreened pulp onto the interior face of the screen wall whereby to prevent escape of air through the washed portions of the screen wall.

10. In a machine for treating a suspension of solids in a liquid hereinafter referred to as pulp, in combination, a casing, a pulp screen structure supporting for rotation within said casing including a cylindrical screen wall, means for delivering unscreened pulp onto the interior face of the screen wall, means for creating a pressure differential between the interior and exterior of said screen wall to augment the passage of the acceptable portions of the pulp through the screen wall, means spaced from said pulp delivery means for washing the screen wall to clear the same of the retained portions of the pulp, and a stationary pressure retaining wall having portions in sealed engagement with the exterior of the screen wall in a circumferential area between said washing means and the point of delivery of the unscreened pulp onto the screen wall whereby to prevent the flow of pressurizing gases through the washed portions of the screen wall.

References Cited by the Examiner

UNITED STATES PATENTS

| | | | |
|---|---|---|---|
| 746,552 | 12/1903 | Moore | 210—391 |
| 1,675,612 | 7/1928 | Laird | 209—304 |
| 1,945,492 | 1/1934 | La Mort | 209—270 |
| 1,992,750 | 2/1935 | Jensen | 285—190 |
| 2,696,916 | 12/1954 | Peterson | 210—236 |
| 2,707,905 | 5/1955 | Mathewson | 209—270 |
| 2,731,951 | 1/1956 | Peyrin | 285—190 |
| 2,753,766 | 7/1956 | Simpson | 210—391 |
| 2,772,897 | 12/1956 | Shaw | 285—190 |
| 2,707,905 | 5/1955 | Mathewson | 209—270 |
| 3,074,553 | 1/1963 | Szepan | 209—273 |

HARRY B. THORNTON, *Primary Examiner.*

EDWARD J. MICHAEL, *Examiner.*

UNITED STATES PATENT OFFICE
CERTIFICATE OF CORRECTION

Patent No. 3,229,815                          January 18, 1966

Wilfred F. Mathewson

It is hereby certified that error appears in the above numbered patent requiring correction and that the said Letters Patent should read as corrected below.

Column 11, line 28, for "bear" read -- gear --; column 14, line 1, for "trough wall continues to and over the protrusion 259." read -- trough wall. Also permanently attached at its lower --; column 21, line 10, for "supporting" read -- supported --.

Signed and sealed this 6th day of December 1966.

(SEAL)
Attest:

ERNEST W. SWIDER                                EDWARD J. BRENNER
Attesting Officer                                    Commissioner of Patents